Patented Apr. 10, 1934

1,954,555

UNITED STATES PATENT OFFICE 1,954,555

PROCESS OF PRODUCING ALLOYS

William Bell Arness, Baltimore, Md., assignor to Alloy Research Corporation, Baltimore, Md., a corporation of Delaware No Drawing. Application August 15, 1931,
Serial No. 557,377

9 Claims. (Cl. 75—22.5)

This invention relates to the manufacture of low carbon steels and irons high in alloy content, especially stainless or corrosion resistant alloys of the chromium-iron and chromium-nickel-iron group, and more particularly to the manufacture of such alloys wherein the chromium content is derived from an ore thereof by a direct reduction of such ore using a suitable reducing agent.

One of the objects of my invention is the production of low carbon alloy irons and steels in a simple, highly efficient and economical manner from readily available and comparatively inexpensive raw materials.

Another object is the production of corrosion resistant alloy irons to a desired specification from ordinary scrap iron an ore of the alloy and available alloy scrap metal, using known and available melting and furnacing equipment. Other objects will be in part obvious and in part pointed out hereinafter.

The invention accordingly consists in the several steps and the relation of each of the same to one or more of the others as described herein and the scope of the application of which is indicated in the following claims.

As conducive to a clearer understanding of certain features of my invention, it may at this point be noted that in the manufacture of chromium-iron stainless alloy steel having a low carbon content it has heretofore been impracticable to remelt any appreciable percentage of scrap having the same analysis as the product being manufactured. The reason for this is that practically all such alloy steels are manufactured in the electric arc furnace, and in remelting high alloy scrap in such furnaces there is usually a pickup of carbon sufficient to raise the carbon content of the melt above the stipulated maximum carbon content of the product.

In the electric arc furnace ordinary steel scrap with small or negligible percentage of oxidizable alloy content may be so treated that practically all of the carbon in such scrap is oxidized out. However, when steel scrap containing a high percentage of oxidizable alloy is remelted the oxidizable alloy, such as for instance chromium, is oxidized in preference to carbon. In addition to this there is usually unavoidable contact between the high alloy scrap and the carbon electrodes, resulting in an actual pickup of carbon from this source. Therefore, in prior practice for the manufacture of low carbon chromium-iron and chromium-nickel-iron alloy stainless steels, it has been customary to melt down an initial charge of plain carbon steel having little or no content of oxidizable alloy, and thereafter make up the entire oxidizable alloy content of the product by the introduction of ferro alloys, or by the reduction of such alloys from their reducible oxides. It is of course understood that the initial charge in a furnace for producing such alloys as are to contain nickel may contain any desired percentage of nickel in the melt down charge inasmuch as nickel is not ordinarily considered to be an oxidizable alloy and does not seriously interfere with the oxidation of carbon.

Thus one of the outstanding objects of my invention is the production of corrosion resistant irons and steels to a desired specification of alloy and carbon contents from available raw materials and heretofore unavailing alloy iron scrap in large quantities.

In accordance with my invention, an initial charge of plain carbon scrap is melted down in the conventional manner and then a reducing period begun during which the required chromium content of the metal bath is supplied by reducing this alloy from chrome ore. To prevent contamination of the metal bath by the reducing agent a 60% excess of chrome ore is preferably used; the reducing agent is conveniently 50% ferro-silicon.

The total chrome ore charge is split up into several batches, each batch being mixed with the proper proportionate amount of ferro-silicon and charged separately into the furnace. As each of these charges of mixed chrome ore and ferro-silicon is charged it forms a thick hard slag blanket or crust over the metal bath which is able to support an appreciable weight.

Advantage is taken of this condition to charge carefully a predetermined weight of alloy scrap, preferably having substantially the same analysis as that of the metal being produced, around the rim or banks of the furnace in such manner that it will positively not come in contact with the carbon electrodes. This charge of alloy scrap is supported on top of this hard, heavy ore-slag blanket until it has reached a melting temperature, and about this time the ore-slag blanket begins to fuse and react thus permitting the alloy scrap charge, which is now in a melting condition, to trickle through it into the metal bath below. By this manner of operation there is no carbon pickup attendant upon the melting of the alloy scrap charge, and in fact a slight loss in carbon occurs.

By remelting alloy scrap in accordance with this method no loss of time in the process occurs, because the time taken to melt the scrap is necessarily coincident with the time required to fuse the ore-slag blanket, also because heat used to raise the temperature of scrap to melting point is largely waste heat otherwise lost by radiation and conduction. Furthermore there is thus provided an outlet for large quantities of readily available and comparatively inexpensive alloy scrap.

Ordinarily the total alloy scrap charge will vary between 25% and 50% of the final tapping weight and is split up equally between the several ore-reducing agent batches. However, it is within the contemplation of the invention that more or less of the total alloy scrap charge may be added with any individual batch of ore-reducing agent.

As illustrative of my invention, an initial charge of 4,500 pounds of common steel scrap is melted down in a 6-ton electric arc furnace as the first step in the manufacture of chromium-iron alloy steel to contain less than .10% carbon and about 17% to 18% chromium. Suitable amounts of iron ore for the oxidation of undesirable carbon in the initial scrap charge, and suitable amounts of basic slag making materials are included. When melted, the melt-down slag is taken off with the exception of a layer of about ½ inch which is left over the bath.

The reducing period is now begun during which 10,000 pounds of chrome ore, containing 49% $Cr_2O_3$ and 15% FeO, and about 2,000 pounds of 50% ferro-silicon used as a reducing agent, are charged together with about 5,000 pounds of alloy scrap analyzing .12% carbon and 18% chromium. The chrome ore and ferro-silicon are divided into three equal batches and intimately mixed. The alloy scrap is likewise divided into three batches. At the beginning of the reducing period the first batch of mixed chrome ore and ferro-silicon is charged. This batch stiffens the small quantity of melt-down slag remaining on the bath and builds up a heavy, hard ore-slag blanket over the metal bath.

Immediately after this batch of chrome ore and ferro-silicon is completely charged, the first batch of alloy scrap is charged. This scrap is carefully placed inside the furnace around the banks so as to be as far as possible from the carbon electrodes. As heat is applied by means of the electric arc, in order to effect fusion and reaction in the ore-slag blanket, the alloy scrap gradually heats up to its melting temperature and trickles down through the partly fused ore-slag blanket.

When this batch of chrome ore and ferro-silicon has been completely fused and the reduction of chromium has completely taken place, the alloy scrap will also be found to have melted and to have been absorbed by the metal bath. This slag is then taken off fairly clean so as to leave a layer only about ½ to 2 inches thick over the bath. The second batch of chrome ore and ferro-silicon followed by the second batch of alloy scrap is then charged and the process repeated until all of the chrome ore and ferro-silicon, and all of the alloy scrap has been charged and properly assimilated.

After the last batch of chrome ore and ferro-silicon has fused and reacted and is ready to slag off, this last slag is taken off preparatory to making up a finishing slag. The finishing slag consists of conventional proportions of burnt lime, fluorspar, and fine ferro-silicon. The purpose of the slag is to reduce whatever residual oxides of iron, chromium and manganese may exist in either slag or metal, and to permit an opportunity for fluxing out of the metal bath any undesirable impurities that may be contained therein. After a suitable period the required manganese content is added to the metal bath and the heat tapped into a ladle and poured into ingot molds. The weight of the heat is about 6 tons, and the analysis shows less than .10% carbon and about 17.5% chromium.

Thus it will be seen that there has been provided in this invention an art for producing alloy irons and steels in which the various objects hereinbefore set forth together with many thoroughly practical advantages are successfully achieved. It will be seen that there is provided a rapid, efficient and economical art for producing an alloy iron or steel to a desired specification and of desired characteristics wherein an outlet is provided for available alloy scrap metal.

While in the illustrative embodiment of my invention set forth above there is used an excess of reducible oxide of the alloy element in proportion to the reducing agent, good results are achieved when no such excess is employed. Likewise, while alloy scrap of substantially the same analysis as that desired in the final metal is illustrated it will be understood that alloy scrap low in carbon content and relatively high in alloy content, the same and/or other alloy metal (for example, iron-chromium and/or nickel), may be employed as desired.

Furthermore, while a portion of the alloy content of the tapped metal is obtained by the direct reduction of a reducible oxide of the alloy metal, illustratively the reduction of chrome ore, good results are had when part of the alloy content is supplied by low carbon ferrochrome in sufficient quantities to form a hard stiff crust over the bath of metal upon which scrap alloy may be charged and melted all as more particularly described above.

As many possible embodiments may be made of my invention and many changes made in the embodiment hereinbefore set forth, it will be understood that all matter described herein is to be interpreted as illustrative, and not in a limiting sense.

What I claim is:

1. The process for producing irons and steels having a high alloy content and a low carbon content, by the direct reduction of ores of alloy metals in an electric furnace having carbon electrodes, which comprises charging upon a molten bath of low carbon iron or steel a mixture of large quantities of a reducible ore of a desired alloy metal and a reducing agent in an amount sufficient to provide a stiff, thick slag, and charging substantial quantities of scrap having a high alloy content upon said thick slag, remote from the electrodes, whereby the scrap is fused and trickles into the molten bath without contact with the carbon electrodes or an increase in carbon content.

2. In a process for producing high alloy content steels and irons of low carbon content by means of the direct reduction, in an electric furnace having carbon electrodes, of reducible ores of alloy metals in the presence of a molten bath of low carbon iron or steel, the improvement which comprises remelting a steel or iron scrap of high alloy content without increasing the carbon content of the irons or steels by charging said scrap remote from said electrodes upon a stiff, heavy slag previously formed over said bath.

3. The process for producing low carbon irons and steels having a high alloy content, by the direct reduction of ores of alloy metals in an electric furnace having carbon electrodes, which comprises charging upon a molten bath of low carbon iron or steel, a mixture of large quantities of a reducible ore of a desired alloy metal and a reducing agent containing silicon in an amount sufficient to provide a stiff, thick slag, and charging low carbon iron or steel scrap having a high alloy content upon said thick slag, remote from the electrodes, whereby the scrap is fused and trickles into the molten bath without contact with the carbon electrodes or an increase in carbon content.

4. In the production of low carbon irons and steels having high alloy contents by the direct reduction of ores of alloy metals in an electric arc furnace having carbon electrodes, the art which includes, charging upon a molten bath of low carbon iron or steel a mixture of large quantities of a reducible ore of a desired alloy metal and a reducing agent therefor in amounts sufficient to provide a stiff, thick slag overlying the surface of said bath, and charging substantial quantities of metallic scrap having substantially the same analysis as the steel or iron under production upon said thick slag remote from said furnace electrodes, whereby the scrap melts and runs into the molten bath without contacting the carbon electrodes or appreciably increasing in carbon content.

5. In the production of alloy irons and steels, the art which includes, preparing a ferrous metal bath, charging a mixture of large quantities of a reducible oxide of the desired alloy metal and a reducing agent therefor onto said bath whereby a crust is formed over the bath, and charging onto said crust scrap alloy metal in substantial quantities, said scrap melting and trickling through said crust into said bath thereby aiding in the reduction of said oxide and enriching the bath.

6. In the production of corrosion resistant iron and steel, the art which includes, preparing a ferrous metal bath, charging a mixture of large quantities of chrome ore and a reducing agent therefor onto the surface of said bath whereby a stiff crust is formed over the bath, and charging onto said crust iron-chromium alloy scrap in substantial proportions, said scrap melting and supplementing said bath with iron and chromium.

7. In the production of corrosion resistant iron and steel, the art which includes, preparing a ferrous metal bath having a thin overlying slag blanket, charging chrome ore, a reducing agent therefor and low carbon ferrochrome onto the surface of said bath in such quantities as to form a stiff crust over said bath, and charging onto said crust iron-chromium alloy scrap, said scrap melting and supplementing said bath with iron and chromium.

8. In the production of alloy iron and steel, the art which includes, preparing a bath of ferrous metal and successively charging onto the surface of said bath a mixture of a reducible oxide of the desired alloy ingredient and a reducing agent therefor, said mixture forming a series of crusts over the surface of said bath, and charging alloy iron or steel scrap onto the successive crusts so formed, said scrap melting and aiding in the reduction of said oxide and supplementing said bath with large quantities of alloy iron and steel.

9. In the production of corrosion resistant iron and steel in an electric furnace employing carbon containing electrodes, the art which includes, preparing a ferrous metal bath, charging an ore of a desired alloy metal, a reducing agent therefor and a chromium containing ingredient onto the surface of said bath whereby a stiff crust is formed thereon, and charging onto said crust chromium-iron scrap remote from said furnace electrodes whereby said scrap is melted, and directly contributes to said bath, and carbon contamination and excess oxidation of said scrap is prevented.

WILLIAM BELL ARNESS.